United States Patent
Stütz

(12) 
(10) Patent No.: US 6,173,989 B1
(45) Date of Patent: Jan. 16, 2001

(54) TENSIONING DEVICE FOR A GAS BAG

(75) Inventor: Michael Stütz, Spraitbach (DE)

(73) Assignee: TRW Occupant Restraint Systems GmbH & Co. KG, Alfdorf (DE)

(*) Notice: Under 35 U.S.C. 154(b), the term of this patent shall be extended for 0 days.

(21) Appl. No.: 09/152,943

(22) Filed: Sep. 14, 1998

(30) Foreign Application Priority Data

Sep. 15, 1997 (DE) .......................................... 297 16 573 U

(51) Int. Cl.[7] .................................................. B60R 21/22
(52) U.S. Cl. ...................... 280/730.2; 280/730.1; 280/728.2
(58) Field of Search .......................... 280/730.2, 730.1, 280/728.2, 733

(56) References Cited

U.S. PATENT DOCUMENTS

| 3,975,258 | * | 8/1976 | Fox | 280/733 |
|---|---|---|---|---|
| 5,480,181 | * | 1/1996 | Bark et al. | 280/730.2 |
| 5,588,672 | * | 12/1996 | Karlow et al. | 280/730.1 |
| 5,788,270 | * | 8/1998 | Haland et al. | 280/730.2 |
| 5,791,683 | * | 8/1998 | Shibata et al. | 280/730.2 |
| 5,924,722 | * | 7/1999 | Koide et al. | 280/730.2 |
| 5,924,723 | * | 7/1999 | Brantman et al. | 280/730.2 |
| 5,957,487 | * | 9/1999 | Stutz | 280/730.2 |
| 5,975,566 | * | 11/1999 | Bocker et al. | 280/730.2 |

* cited by examiner

Primary Examiner—Daniel G. DePumpo
Assistant Examiner—James S. McClellan
(74) Attorney, Agent, or Firm—Tarolli, Sundheim, Covell, Tummino & Szabo L.L.P.

(57) ABSTRACT

A tensioning device for a head protection restraining system in vehicles comprises an inflatable gas bag with two ends extending between an A-column and a C-column of the vehicle, one of said ends of said gas bag being fastened to the A-column and the other to the C-column. To provide a tensioning device for the gas bag which ensures that the gas bag remains tensioned between the A and C columns even in its vented state, a tensioned spring is arranged between at least one of said ends of the gas bag and its adjacent column.

3 Claims, 1 Drawing Sheet

TENSIONING DEVICE FOR A GAS BAG

FIELD OF THE INVENTION

The invention concerns a tensioning device for a head protection restraining system in vehicles, comprising an inflatable gas bag extending between the A-column and the C-column of the vehicle, one end of which is fastened to the A-column and the other to the C-column.

BACKGROUND OF THE INVENTION

In its inflated state, the gas bag in such a head protection restraining system is tensioned between the A and C columns, since the increase in volume during the inflation process implies a simultaneous contraction in length. In its tensioned state the gas bag ensures lateral support even with burst windowpanes. As a result of unavoidable leakage losses and/or an intentional gas discharge to dissipate impact energy, the gas bag then relaxes so that it regains its original length and its lower edge hangs down loosely.

SUMMARY OF THE INVENTION

The invention provides a tensioning device for a gas bag of the type described, which ensures that the gas bag remains tensioned between the A and C columns of the vehicle even in its vented state.

In accordance with the invention, a tensioned spring is arranged between at least one end of the gas bag and its adjacent column. When the length contraction of the gas bag reduces during the venting process, the tensioned spring accordingly relaxes and automatically compensates for the corresponding increase in length of the gas bag to the required amount, in order to maintain the tension of the lower gas bag edge.

BRIEF DESCRIPTION OF THE DRAWINGS

Further features of the invention will become apparent from the attached claims, and from the following description, with reference to the attached drawings, in which:

DESCRIPTION OF THE PREFERRED EMBODIMENT

Figure 1:
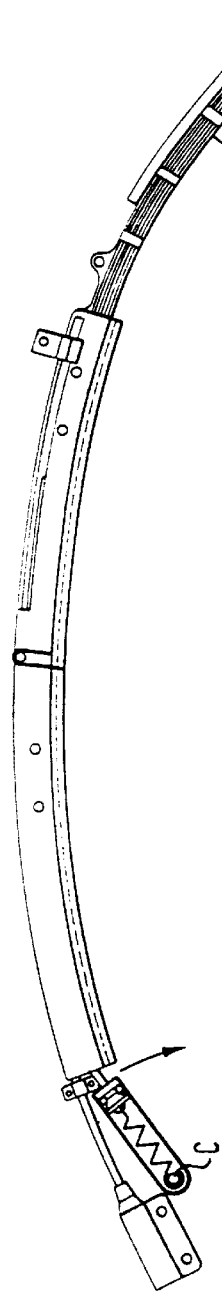
FIG. 1 shows a schematic representation of a head protection restraint system in its non-activated state.
Figure 3:
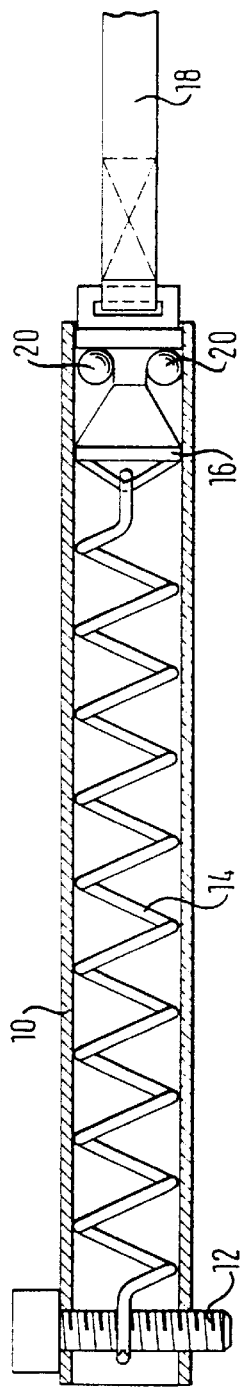
FIG. 3 is a schematic representation of a tensioning device with a tensioned spring received within a tube.

The head protection gas bag module shown in its deactivated condition in FIG. 1 is curved over its entire length and extends between the A and C columns of the vehicle. The attachment points at the gas bag ends are marked A and C, correspondingly. The end of the gas bag adjoining the C-column is not attached directly to the column, but by means of the tensioning device shown in FIG. 3. This tensioning device consists of a cylindrical tube 10, one end of which is pivotally attached to the C-column by means of a bolt 12, a tensioned spring 14 hooked at one end over the bolt 12, and a piston 16 which is movably received in the tube 10 and to which is hooked the other end of the tensioned spring 14. The adjoining end of the gas bag is connected to the piston 16 by means of a traction band 18. The piston 16 is provided with a reverse stroke inhibiting means in the form of two roller bodies 20, arranged between each of the inclined surfaces of the piston and the inner surface of the tube 10.

Figure 2:
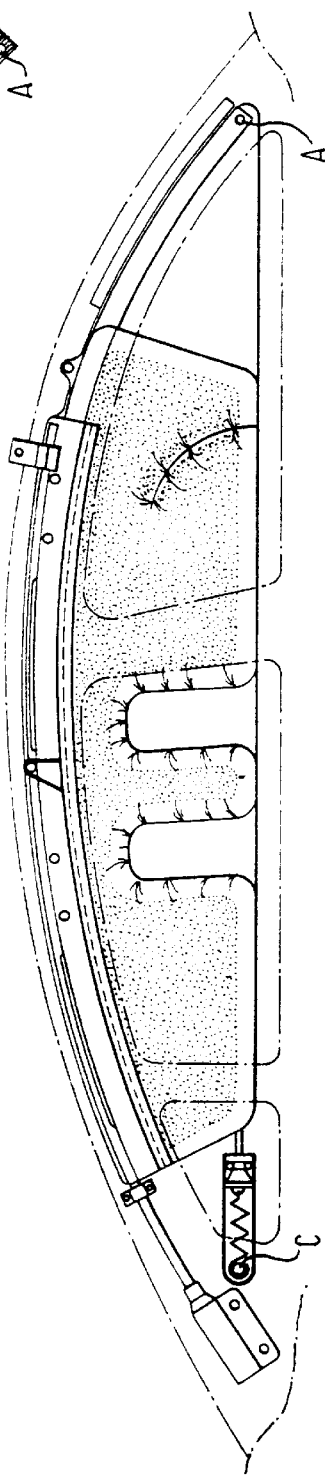
FIG. 2 shows the restraining device in the activated state.

When the gas bag is in the state shown in FIG. 1, the tension spring 14 is taut, since the folded gas bag as a whole is fitted to follow a curved shape. Even when the gas bag is in its activated state, as shown in FIG. 2, the tension spring 14 is taut, since the lower edge of the gas bag is shortened on account of the length contraction resulting from the increase in volume of the gas bag.

As the gas bag is subsequently vented, the lower bag edge, however, progressively regains its original length, but as the tensioned spring 14 shortens at the same rate, the gas bag remains tensioned between the fixing points A and C even after it has become completely vented. The reverse stroke inhibiting means at the piston 16 ensures that the tensioned gas bag, also when under load, provides an effective support and head protection, even in its vented state.

What is claimed is:

1. A tensioning device for a head protection restraining system in vehicles, comprising:

an inflatable gas bag with two ends, said gas bag extending between an A-column and a C-column of the vehicle, one of said ends of said gas bag being fastened to said A-column and the other to said C-column;

a cylindrical tube having one end which is pivotally attached to one of said columns;

a piston slidably movable in said tube and being coupled to one of said ends of said gas bag, said piston being provided with a reverse stroke inhibiting means comprising at least one roller body arranged between an inclined surface of said piston and an inner surface of a wall of said tube; and a spring having a first end and a second end, said first end of said spring being coupled to said one end of said tube, said second end of said spring being coupled to said piston, said spring being tensioned both in a non-activated state and in an activated state of said gas bag when said gas bag is fully deployed.

2. The device according to claim 1, wherein said at least one end of said gas bag is attached to said piston by a traction band.

3. The device according to claim 1, wherein the tensioning degree of said spring is-substantially the same in said non-activated state and in said activated state of said gas bag.

* * * * *